United States Patent
Saito

(10) Patent No.: US 10,534,295 B2
(45) Date of Patent: Jan. 14, 2020

(54) FIXING APPARATUS FOR FIXING A TONER IMAGE TO A SHEET, THE FIXING APPARATUS BEING OPERABLE IN RELATION TO EITHER OF A FIRST NOMINAL VOLTAGE OF A SECOND NOMINAL VOLTAGE AS AN ALTERNATING VOLTAGE OF A COMMERCIAL ALTERNATING CURRENT POWER SUPPLY

(71) Applicant: CANON KABUSHIKI KAISHA, Tokyo (JP)

(72) Inventor: Hiroshi Saito, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/977,083

(22) Filed: May 11, 2018

(65) Prior Publication Data
US 2018/0335736 A1  Nov. 22, 2018

(30) Foreign Application Priority Data

May 18, 2017 (JP) .................. 2017-099212
Apr. 6, 2018 (JP) .................. 2018-074044

(51) Int. Cl.
G03G 15/20 (2006.01)
G03G 15/00 (2006.01)
H02M 7/06 (2006.01)

(52) U.S. Cl.
CPC ..... *G03G 15/2039* (2013.01); *G03G 15/5004* (2013.01); *H02M 7/06* (2013.01)

(58) Field of Classification Search
CPC ............ G03G 15/2039; G03G 15/80; G03G 15/5004; G03G 15/205
See application file for complete search history.

(56) References Cited

U.S. PATENT DOCUMENTS

| 8,260,165 | B2 * | 9/2012 | Chosokabe | ........ G03G 15/2039 |
| | | | | 219/216 |
| 2014/0341599 | A1 * | 11/2014 | Itoh | .................... G03G 15/2039 |
| | | | | 399/69 |
| 2016/0216662 | A1 * | 7/2016 | Kosaka | .............. G03G 15/2039 |

FOREIGN PATENT DOCUMENTS

JP  2011-002782 A  6/2011

* cited by examiner

*Primary Examiner* — Walter L Lindsay, Jr.
*Assistant Examiner* — Jessica L Eley
(74) *Attorney, Agent, or Firm* — Venable LLP

(57) ABSTRACT

A fixing apparatus includes a controller that determines a duty ratio of a drive signal to be a first duty ratio if an alternating voltage of a commercial alternating current power supply detected by a voltage detector is less than a predetermined voltage, and to determine the duty ratio of the drive signal to be a second duty ratio, which is less than the first duty ratio, if the alternating voltage is greater than the predetermined voltage. The controller also supplies the drive signal, set to the determined duty ratio, to a driving circuit if a temperature detected by a temperature detector is less than a first temperature, and not to supply the drive signal to the driving circuit if the temperature detected by the temperature detector is not less than the first temperature.

15 Claims, 5 Drawing Sheets

FIXING APPARATUS FOR FIXING A TONER IMAGE TO A SHEET, THE FIXING APPARATUS BEING OPERABLE IN RELATION TO EITHER OF A FIRST NOMINAL VOLTAGE OF A SECOND NOMINAL VOLTAGE AS AN ALTERNATING VOLTAGE OF A COMMERCIAL ALTERNATING CURRENT POWER SUPPLY

This application claims the benefit of Japanese Patent Application No. 2017-099212, filed on May 18, 2017, and Japanese Patent Application No. 2018-074044, filed on Apr. 6, 2018, both of which are hereby incorporated by reference herein in their entireties.

BACKGROUND OF THE INVENTION

Field of the Invention

The present invention relates to a fixing apparatus, an image forming apparatus, and a method for controlling the same.

Description of the Related Art

An electrophotographic type image forming apparatus uses a fixing device to fix to a sheet an unfixed toner image that was transferred to the sheet. U.S. Pat. No. 8,260,165 describes a fixing device that employs a halogen heater as a heat source. Specifications of the halogen heater are decided in accordance with what is treated as a necessary amount of heat and power supply voltage. If the applied voltage is less than the regular voltage, the necessary amount of heat will not be achieved. If the applied voltage is greater than the regular voltage, the lifespan of the halogen heater will be shortened. Although image forming apparatuses are used in various countries and regions, the power supply voltage supplied from a commercial power supply differs by country and region. For example, the power supply voltage within the country of Japan is 100V, the power supply voltage in North America is 120V, and the power supply voltage within Europe is 220V to 240V. Accordingly, a halogen heater specification suited to a sales destination is selected and is installed in the image forming apparatus from among a plurality of types halogen heater specifications.

Incidentally, it is necessary for a large-type image forming apparatus used in commercial printing, and the like, to have a power supply voltage of a 200V class. As a power supply voltage of a 200V class, within the country of Japan, the power supply voltage is 200V and within Europe, the power supply voltage is 220V to 240V. In North America, there is a mix of buildings supplied with a power supply voltage of 208V and buildings supplied with a power supply voltage of 240V even in the same region. Accordingly, in the case of a destination being North America, it is necessary that a halogen heater be capable of handling a power supply voltage of 208V to 240V. It is assumed that a halogen heater of a specification that can guarantee a necessary amount of heat even at 208V is employed in products destined for North America. When a halogen heater of such a specification is used in a building to which 240V is supplied, it is possible that the lifespan will end up being approximately ⅓ what it would be in the case in which it is used in a building to which 208V is supplied. If halogen heaters whose specifications are appropriate to the respective buildings are installed in the same marketing destination, not only the fixing device manufacturing process, but also image forming apparatus maintenance management will become complicated. In other words, a maintenance manager will need to replace heaters by bringing a halogen heater that is appropriate for the respective building and, as a result, the maintenance management burden will be heavier.

SUMMARY OF THE INVENTION

Accordingly, the present invention enables a heater of a single specification that can operate at either of a first nominal voltage and a second nominal voltage, as an alternating voltage of a commercial alternating current power supply, to be employed without sacrificing the lifespan of the heater.

In one aspect, the present invention provides a fixing apparatus operable in relation to either of a first nominal voltage and a second nominal voltage, as an alternating voltage of a commercial alternating current power supply, the apparatus comprising a first rotating member, a second rotating member arranged to face the first rotating member and configured to convey a sheet while nipping the sheet with the first rotating member, a first heater configured to be supplied with the alternating voltage from the commercial alternating current power supply and to heat the first rotating member, a voltage detector configured to detect the alternating voltage of the commercial alternating current power supply, a temperature detector configured to detect a temperature of the first heater or the first rotating member, a driving circuit configured to supply to the first heater a power based on an alternating current supplied from the commercial alternating current power supply if a drive signal is being input, and to not supply to the first heater the power if the drive signal is not being input, and a controller configured to determine a duty ratio of the drive signal to be a first duty ratio if the alternating voltage of the commercial alternating current power supply detected by the voltage detector is less than a predetermined voltage, and to determine the duty ratio of the drive signal to be a second duty ratio less than the first duty ratio if the alternating voltage detected by the voltage detector is greater than the predetermined voltage, and to supply to the driving circuit the drive signal set to the determined duty ratio if the temperature detected by the temperature detector is less than a first temperature, and to not supply to the driving circuit the drive signal if the temperature detected by the temperature detector is not less than the first temperature, wherein the predetermined voltage is a value that is greater than the first nominal voltage and less than the second nominal voltage.

Further features of the present invention will become apparent from the following description of exemplary embodiments with reference to the attached drawings.

DESCRIPTION OF THE EMBODIMENTS

Image Forming Apparatus

Figure 1:
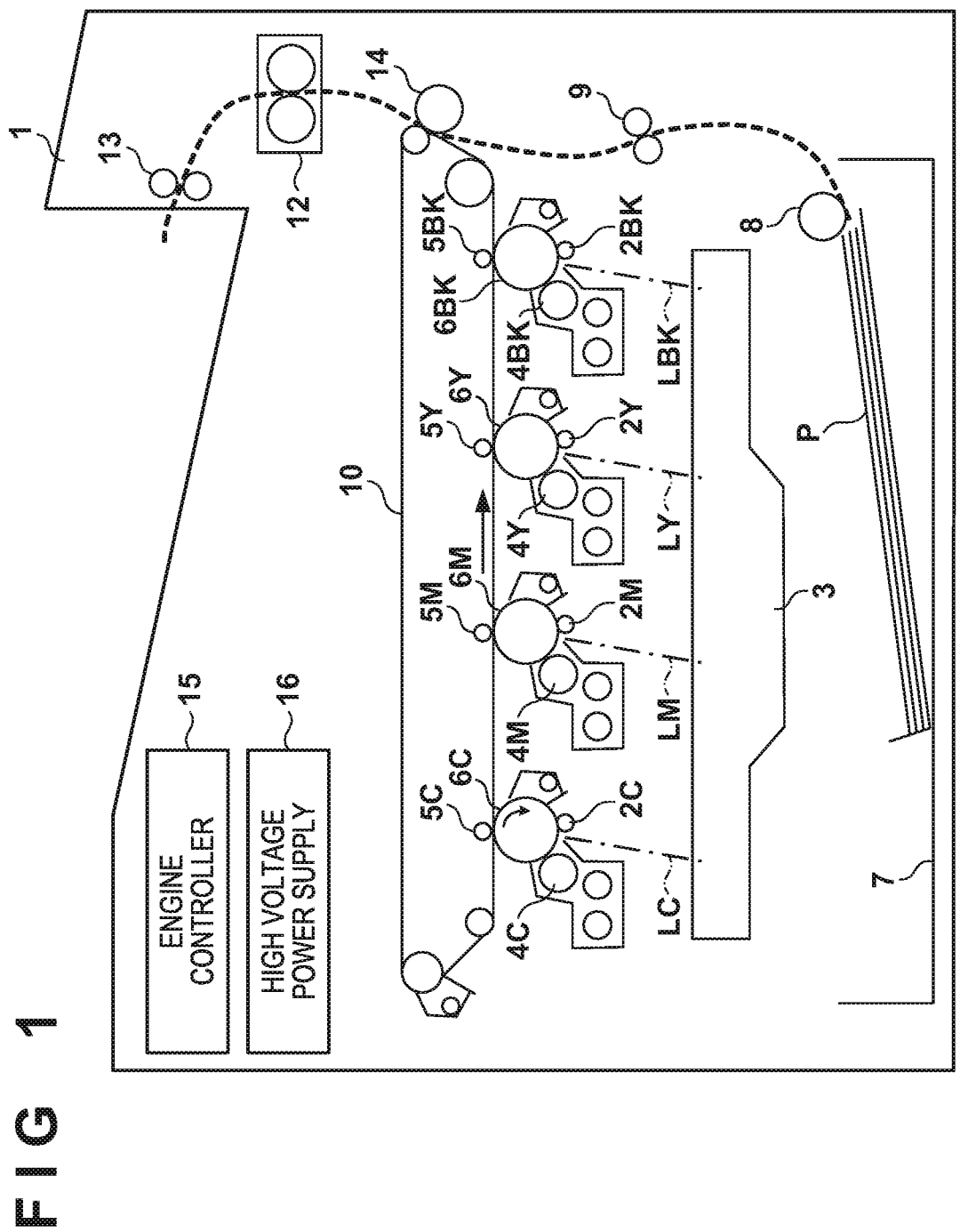
FIG. 1 is an overview cross-sectional view illustrating an image forming apparatus.

FIG. 1 illustrates an intermediate transfer type image forming apparatus 1. The image forming apparatus 1 may be an image forming apparatus for forming a monochrome image, but here, it is an electrophotographic type image forming apparatus that forms a multicolor image by color mixing of a plurality of colorants. The image forming apparatus 1 uses toner of four colors, such as yellow (Y), magenta (M), cyan (C), and black (BK). Characters indicating a color are added to the end of reference numerals in FIG. 1, but these characters are omitted when matters common to the four colors are described.

Photosensitive drums 6C, 6M, 6Y, and 6BK are arranged at regular intervals relative to each other, and are image carriers for carrying an electrostatic latent image or a toner image. An engine controller 15 controls a high voltage power supply 16 to generate a charging voltage, and supplies the charging voltage to a primary charger 2. The primary charger 2 is an example of a charging unit for uniformly charging an image carrier. The primary charger 2 uses the charging voltage to uniformly charge the surface of a photosensitive drum 6. An optical scanning device 3 is one example of a scanning unit that forms an electrostatic latent image by scanning a laser beam on a surface of the image carrier. The optical scanning device 3 emits, toward the photosensitive drum 6, light beams (laser beams) L that are respectively modulated based on an input image. The light beams (laser beams) L form an electrostatic latent image on the surface of the photosensitive drum 6. The engine controller 15 controls the high voltage power supply 16 to generate a developing voltage, and supplies the developing voltage to a developer 4. The developer 4 is one example of a developer unit that forms a toner image by developing the electrostatic latent image by causing toner to adhere to the surface of the photosensitive drum 6. The developer 4 causes cyan, magenta, yellow, and black toner to adhere to the electrostatic latent image formed on the surface of the photosensitive drum 6, via a sleeve or a blade to which developing voltages are respectively applied. By this arrangement, the electrostatic latent image is developed and a developer image (a toner image) is formed.

A feeding roller 8 feeds sheets P, one by one, accommodated in a feeding tray 7. A registration roller 9 feeds the sheets P in synchronism with a write timing of an image with respect to a secondary transfer unit.

The engine controller 15 controls the high voltage power supply 16 to generate a primary transfer voltage, and supplies the primary transfer voltage to a primary transfer roller 5. The primary transfer roller 5 transfers the toner image formed on the photosensitive drum 6 onto an intermediate transfer belt 10. The primary transfer voltage applied to the primary transfer roller 5 promotes the transfer of the toner image to the intermediate transfer belt 10. The intermediate transfer belt 10 functions as an intermediate transfer body. A driving roller 11 is a roller that causes the intermediate transfer belt 10 to rotate. A secondary transfer unit has a secondary transfer roller 14. The engine controller 15 controls the high voltage power supply 16 to generate a secondary transfer voltage, and supplies the secondary transfer voltage to the secondary transfer roller 14. In the secondary transfer unit, by the intermediate transfer belt 10 and the secondary transfer roller 14 conveying while nipping the sheet P, the multicolor toner image carried on the intermediate transfer belt 10 is transferred to the sheet P. The secondary transfer voltage promotes the transfer of the toner image to the sheet P. After this, the sheet P is conveyed to a fixing device 12. The fixing device 12 applies heat and pressure to the toner image carried on the sheet P to fix it thereto. A discharging roller 13 discharges the sheet P on which the image is formed. Note the primary transfer roller 5, the intermediate transfer belt 10, and the secondary transfer roller 14 are an example of a transfer unit that transfers a toner image onto a sheet P. The fixing device 12 is one example of a fixing unit that fixes the toner image that is carried on the sheet P.

Fixing Device

Figure 2:
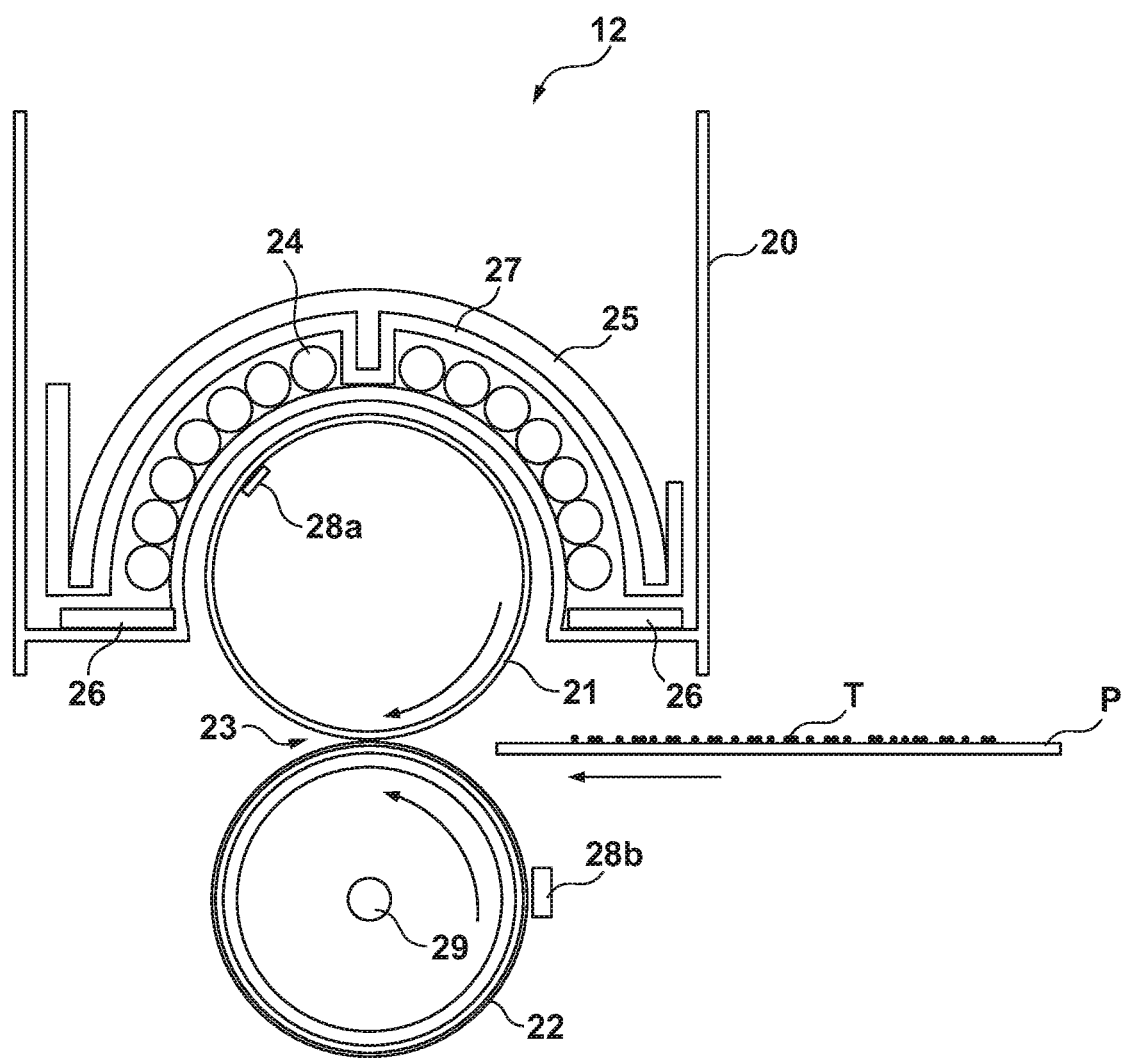
FIG. 2 is an overview cross-sectional view illustrating a fixing device.

As FIG. 2 illustrates, the fixing device 12 has a first rotating member and a second rotating member. The second rotating member is arranged to face the first rotating member and conveys a sheet while nipping the sheet with the first rotating member. A pressure roller 22 is one example of the first rotating member. A fixing belt 21 is one example of a film shaped (belt shaped) second rotating member. The fixing belt 21 has a flexible layer and a conductive heating layer arranged on the bottom side of the flexible layer. The conductive heating layer includes a conductive heating member. The thickness of the conductive heating member is 45 µm, for example. The flexible layer may be a rubber layer, for example. The thickness of the rubber layer is 300 µm, for example. The pressure roller 22 has a metal cylinder (pipe), a thermostable elastic member layer formed on the surface of the cylinder, and a release layer formed on the thermostable elastic member. The material of the cylinder is aluminum or iron, for example. Also, the material of the thermostable elastic member is silicone rubber or fluororubber, for example. The material of the release layer is tetrafluoroethylene-perfluoroalkyl vinyl ether copolymer (PFA) or polytetrafluoroethylene (PTFE), for example.

As FIG. 2 illustrates, the fixing belt 21 is arranged facing the pressure roller 22. The fixing belt 21 and the pressure roller 22 convey a sheet P while nipping the sheet P. The fixing belt 21 forms the pressure roller 22 and the nip unit 23. When the pressure roller 22 rotates by a driving force being transferred from a driving source, such as a motor, the driving force is also transferred to the fixing belt 21 via the nip unit 23 and the fixing belt 21 also rotates. When the sheet P passes through the nip unit 23, pressure and heat are added from the fixing belt 21 and the pressure roller 22. By this arrangement, a toner image T on the sheet P is heated and pressed to be fixed to the sheet P.

As FIG. 2 illustrates, an electromagnetic induction coil 24 is arranged facing the fixing belt 21. The electromagnetic induction coil 24 is fixed to a coil holder 20. Magnetic material cores 25 and 26 are arranged on the outside of the electromagnetic induction coil 24. The magnetic material cores 25 and 26 form a magnetic path. Two magnetic material cores 25 are held in a core holder 27. The magnetic material core 26 is held in the coil holder 20. A magnetic field is generated by a high frequency current flowing in the electromagnetic induction coil 24. By the magnetic field acting on the conductive heating member of the fixing belt 21, an eddy current flows in the conductive heating member heating the conductive heating member. The conductive heating member or the electromagnetic induction coil 24 are examples of a second heater. A thermistor 28a is one example of a second temperature detector that detects the temperature of the second heater or the second rotating member. The thermistor 28a is in contact with the inside of the conductive heating member of the fixing belt 21 and detects the temperature of the conductive heating member, for example.

A halogen heater 29, which is one example of a first heater, is arranged within the pressure roller 22. Heat that the halogen heater 29 generates heats the pressure roller 22. A thermistor 28b is in contact with the outer circumferential surface of the pressure roller 22. The thermistor 28b is one example of a first temperature detector that detects a temperature of the first heater or the first rotating member. In FIG. 2, the thermistor 28b is arranged such that it detects the temperature of the pressure roller 22.

Heat Circuit of the Fixing Device

Figure 3:
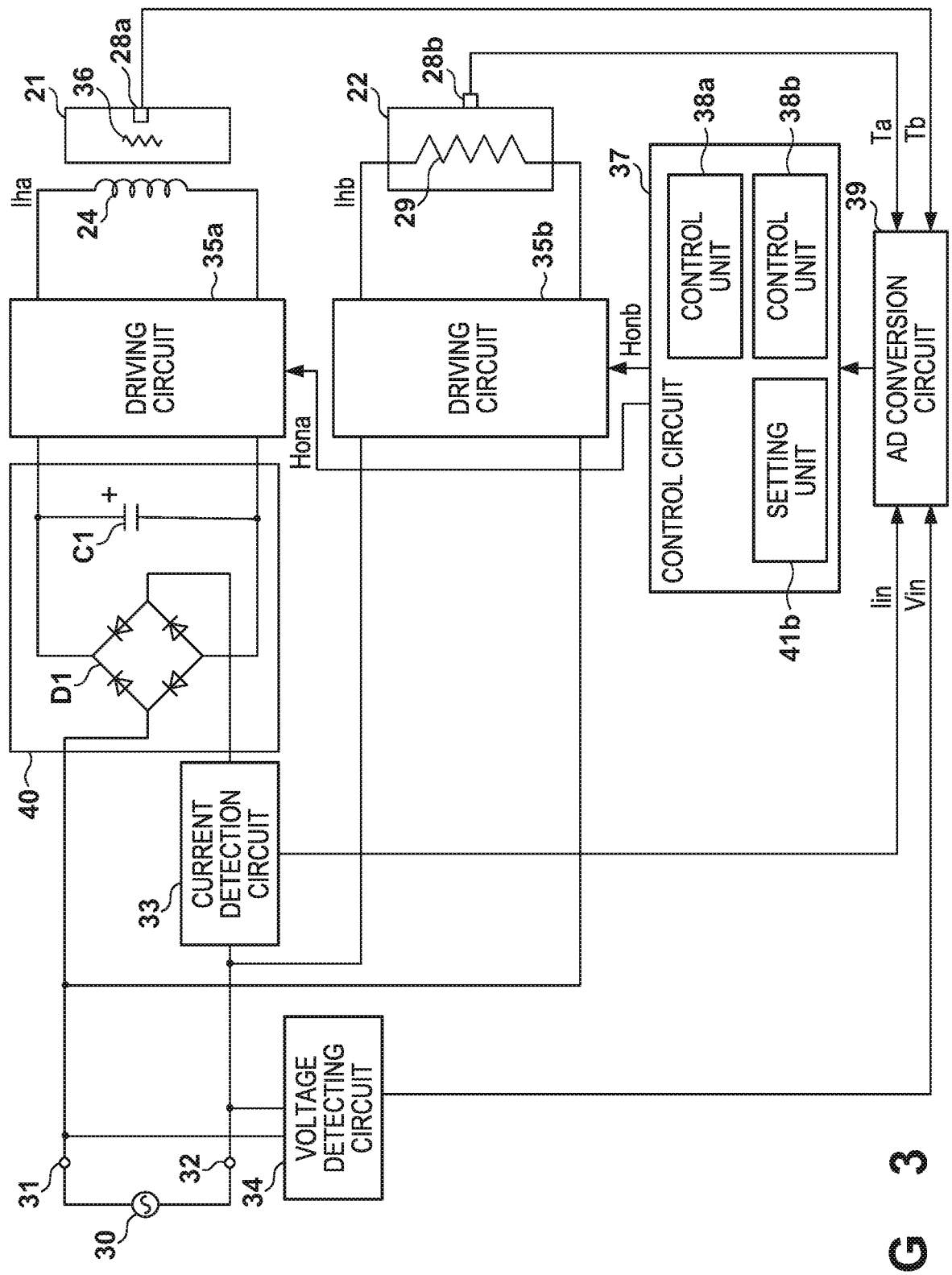
FIG. 3 is a block diagram illustrating a heat circuit.

FIG. 3 illustrates a heat circuit. Input terminals 31 and 32 connect to a commercial alternating current power supply 30. Hereafter, the letter "a" is added to the end of a circuit, signal, or number relating to the fixing belt 21. The letter "b" is added to the end of a circuit, signal, or number relating to the pressure roller 22. The fixing device 12 is configured such that the nominal voltage of the commercial alternating current power supply 30 is used regardless of the first nominal voltage (e.g., 208V) and the second nominal voltage (e.g., 240V). Conventionally, either a halogen heater for the first nominal voltage or a halogen heater for the second nominal voltage halogen heater is installed depending on the destination of the fixing device 12. In other words, conventionally, the halogen heater for the first nominal voltage is installed and the halogen heater for the second nominal voltage is not installed in a region in which the first nominal voltage is used.

A control circuit 37 is configured by at least one processor and controls operations for heating of the fixing device 12. A voltage detecting circuit 34 is a circuit for detecting an alternating voltage Vin applied to the input terminals 31 and 32 from the commercial alternating current power supply 30. The voltage detecting circuit 34 may be configured by a voltage-dividing circuit that generates a small voltage proportional to the alternating voltage Vin, for example. A current detection circuit 33 is a circuit for detecting an alternating current Iin supplied from the commercial alternating current power supply 30. The current detection circuit 33 is a resistance element, or the like, for conversion into a voltage proportional to the alternating current Iin. The current detection circuit 33 may be omitted. A diode bridge D1 and a capacitor C1 form a rectification smoothing circuit 40 that generates a direct current by rectifying and smoothing the alternating current supplied from the commercial alternating current power supply 30. The rectification smoothing circuit 40 supplies a direct-current voltage to a driving circuit 35a. The driving circuit 35a applies, to the electromagnetic induction coil 24, a high frequency current Iha generated by turning the direct current voltage on and off at high frequencies in accordance with a pulse-shaped drive signal Hona output from the control section 38a of the control circuit 37. By this arrangement, a current is induced in the conductive heating member 36 of the fixing belt 21, and heat is generated.

A driving circuit 35b is connected to the commercial alternating current power supply 30 in parallel with the rectification smoothing circuit 40. The driving circuit 35b applies, to the halogen heater 29, a current Ihb based on the current Iin supplied from the commercial alternating current power supply 30 when a pulse-shaped drive signal Honb output from a control section 38b of the control circuit 37 is a high level (first level). The current Ihb is not supplied to the halogen heater 29 when the drive signal Honb is a low level (second level). The cycle of the drive signal Honb is the same as the cycle of the current Iin and is synchronized with the current Iin. The period of the high level of one cycle of the drive signal Honb is decided in accordance with the nominal voltage of the commercial alternating current power supply 30. By this arrangement, the halogen heater 29 heats the pressure roller 22.

An analog/digital (A/D) conversion circuit 39 performs analog-to-digital conversion of the alternating voltage Vin and the alternating current Iin and outputs the result to the control circuit 37. The A/D conversion circuit 39 performs analog-to-digital conversion of a detection signal, which indicates the temperature Ta of the fixing belt 21 that the thermistor 28a detects, and a detection signal, which indicates the temperature Tb of the pressure roller 22 that the thermistor 28b detects, and outputs them to the control circuit 37.

The control section 38a decides a power that should be supplied to the electromagnetic induction coil 24 based on the alternating voltage Vin, the alternating current Iin, the temperature Ta of the fixing belt 21, and target temperature of the fixing belt 21. Additionally, the control section 38a decides the frequency of the drive signal Hona so that the decided power can be obtained. Note, the duty ratio of the drive signal Hona is fixed to a predetermined value. Note, the "on" width of the drive signal Hona may be made variable and the "off" width may be made fixed. By this arrangement, the temperature of the fixing belt 21 maintains a target temperature.

A setting section 41b sets the duty ratio of the drive signal Honb to a first duty ratio d1 if the alternating voltage Vin is less than the threshold (in other words, the nominal voltage of the commercial alternating current power supply 30 is the first nominal voltage). The setting section 41b sets the duty ratio of the drive signal Honb to a second duty ratio d2 if the alternating voltage Vin is not less than the threshold (in other words, the nominal voltage of the commercial alternating current power supply 30 is the second nominal voltage). Here, the second duty ratio d2 is a value that is less than the first duty ratio d1 and that is defined in advance in accordance with the first nominal voltage and the second nominal voltage. The control section 38b supplies the drive signal Honb to the driving circuit 35b if the temperature Tb is less than the first temperature, which is the target temperature of the pressure roller 22. Here, the duty ratio of the drive signal Honb is set by the setting section 41b. Accordingly, in each cycle of the alternating current Iin, the halogen heater 29 is supplied with an alternating voltage for a period corresponding to the set duty ratio when the drive signal Honb is supplied to the driving circuit 35b. Also, the control section 38b does not supply to the driving circuit 35b the drive signal Honb if the temperature Tb is not less than the first temperature. The alternating voltage is not supplied to the halogen heater 29 if the drive signal Honb is not supplied to the driving circuit 35b regardless of the set duty ratio. By this arrangement, the temperature of the pressure roller 22 maintains a target temperature.

Flowchart

Figure 4:
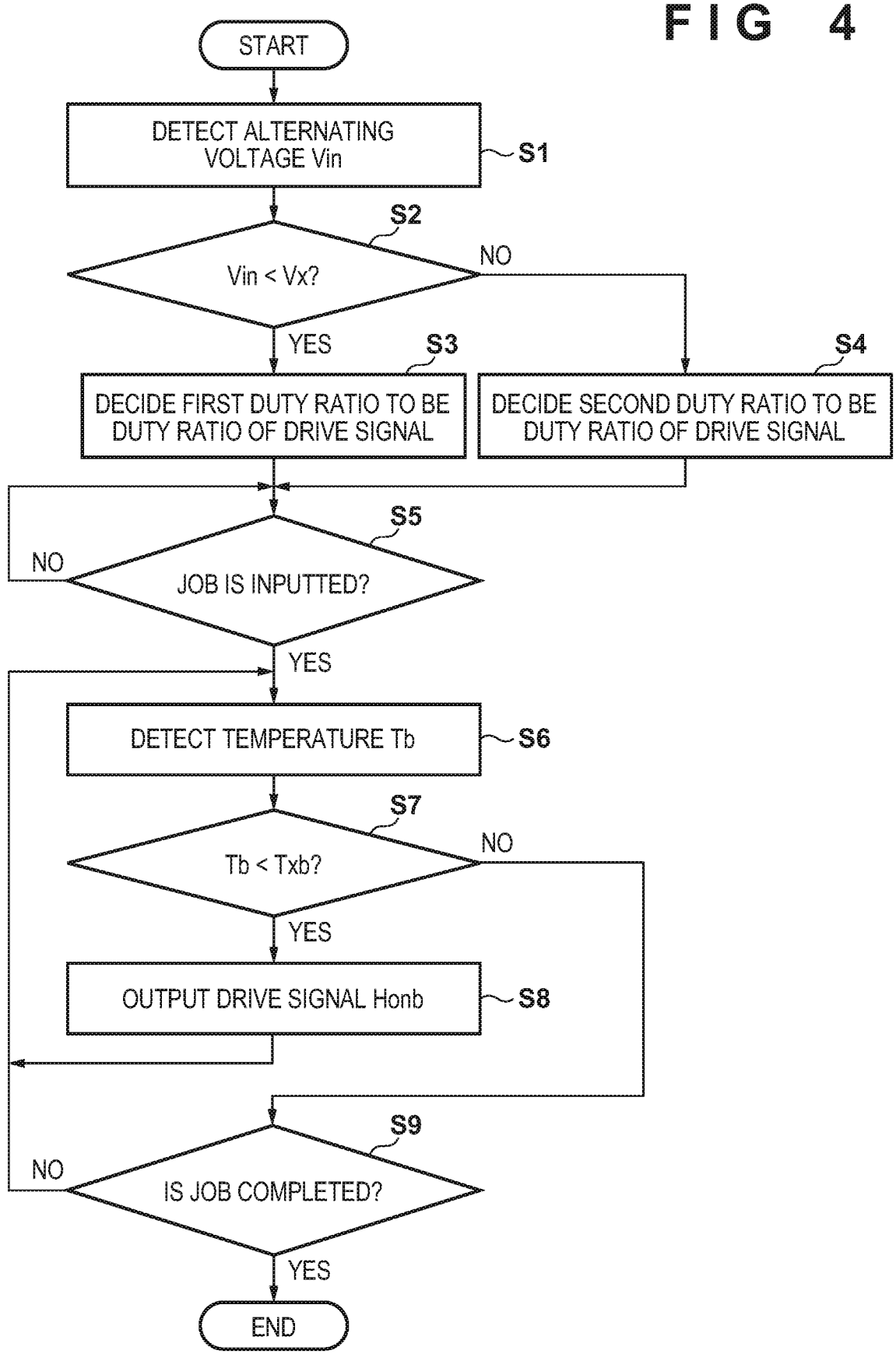
FIG. 4 is a flowchart illustrating a method for controlling the fixing device.

FIG. 4 is a flowchart indicating steps that the control circuit 37 executes. Here, steps relating to the halogen heater 29 are described. Note, step S1 to step S9, which are executed by the control circuit 37, in FIG. 4 indicate processes.

In step S1, the control circuit 37 (the setting section 41b) detects the alternating voltage Vin supplied from the commercial alternating current power supply 30 by using the voltage detecting circuit 34.

In step S2, the control circuit 37 (the setting section 41b) determines whether or not the alternating voltage Vin is less than the threshold value Vx. The threshold value Vx is greater than the first nominal voltage and less than the second nominal voltage. The threshold value Vx may be set to an intermediate value between the first nominal voltage and the second nominal voltage. For example, the threshold value Vx is set to 224V in a case in which the first nominal voltage is 208V and the second nominal voltage is 240V. The control circuit 37 advances the processing to step S3 if the alternating voltage Vin is less than the threshold value Vx. On the other hand, the control circuit 37 advances the processing to step S4 if the alternating voltage Vin is greater than or equal to the threshold value Vx.

In step S3, the control circuit 37 (the setting section 41b) sets the first duty ratio d1 to the duty ratio d of the drive signal Honb. In other words, the setting section 41b sets the first duty ratio d1 to the control section 38b. The first duty ratio d1 is 100%, for example.

The control circuit 37 advances the processing to step S5.

In step S4, the control circuit 37 (the setting section 41b) sets the second duty ratio d2 to the duty ratio d of the drive signal Honb. In other words, the setting section 41b sets the second duty ratio d2 to the control section 38b. The second duty ratio d2 is 80%, for example.

The control circuit 37 advances the processing to step S5.

In step S5, the control circuit 37 (the control section 38b) determines whether or not an image forming job is input. The control circuit 37 advances the processing to step S6 when an image forming job is input.

In step S6, the control circuit 37 (the control section 38b) detects the temperature Tb of the pressure roller 22 by using the thermistor 28b.

In step S7, the control circuit 37 (the control section 38b) determines whether or not the temperature Tb is less than the target temperature Txb. Note, the target temperature Txb is decided by the control circuit 37 in accordance with the type of the sheet P (e.g., existence/absence of a gloss coating, grammage, thickness, and the like). If the temperature Tb is less than the target temperature Txb, the control circuit 37 advances the processing to step S8. If the temperature Tb is greater than or equal to the target temperature Txb, the control circuit 37 causes the image forming apparatus 1 to execute image formation and advances the processing to step S9.

In step S8, the control circuit 37 (the control section 38b) starts output of the drive signal Honb in order to bring the temperature Tb closer to the target temperature Txb. The duty ratio d of the drive signal Honb is a duty ratio set in accordance with the alternating voltage Vin. The driving circuit 35b supplies the alternating current through the halogen heater 29 when the level of the drive signal Honb is a high level. The driving circuit 35b does not supply the alternating current through the halogen heater 29 when the level of the drive signal Honb is a low level. Specifically, on/off control with respect to the halogen heater 29 is performed in accordance with the temperature of the pressure roller 22, and within the on control period according to the on/off control, the halogen heater 29 is controlled to be on/off by the set duty ratio.

In step S9, the control circuit 37 (the control section 38b) determines whether or not an image forming job is completed. The control circuit 37 determines that the image forming job has completed when an image is formed on every page designated by the image forming job. Also, the control circuit 37 determines that the image forming job has not completed if a page on which an image is not formed remains, and advances the processing to step S6.

Drive Signal and Supply Current

Figure 5A:
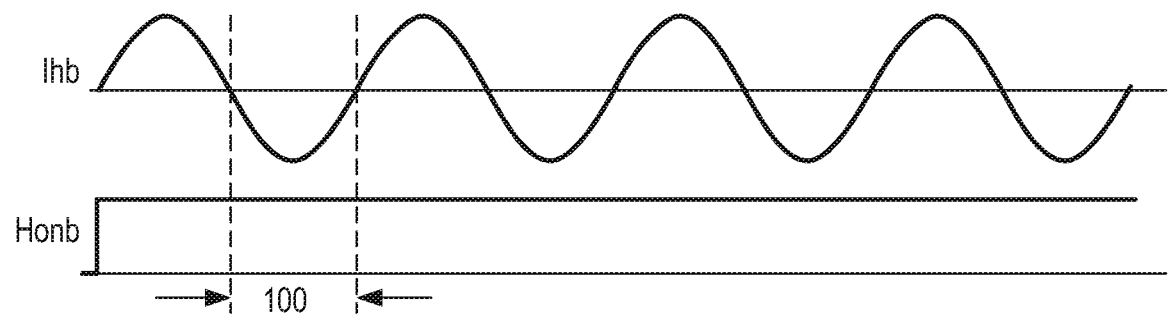
FIG. 5A is a view illustrating a duty ratio and a current waveform of a drive signal.
Figure 5B:
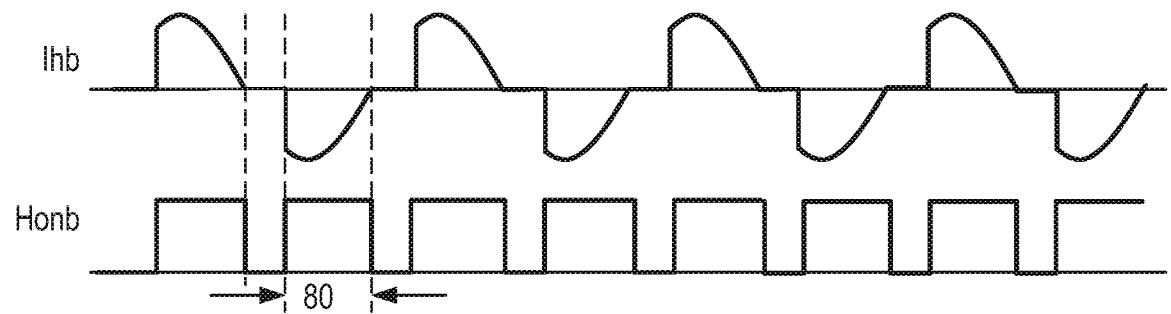
FIG. 5B is a view illustrating a duty ratio and a current waveform of a drive signal.

FIG. 5A illustrates a relationship of the drive signal Honb and the current Ihb supplied to the halogen heater 29 when the alternating voltage Vin is less than the threshold value Vx. FIG. 5B illustrates a relationship of the drive signal Honb and the current Ihb when the alternating voltage Vin is greater than or equal to the threshold value Vx. Regular power of the halogen heater 29 is decided by assuming that the alternating voltage Vin is 208V. Hypothetically, when the alternating voltage Vin is 240V, power exceeding the regular power is supplied to the halogen heater 29 if the drive signal Honb of a 100% duty ratio is output. For this reason, the lifespan of the halogen heater 29 may become shorter. On the other hand, the drive signal Honb of an 80% duty ratio is output when the alternating voltage Vin is 240V in the present embodiment. For this reason, power less than or equal to the regular power is supplied to the halogen heater 29 and the lifespan of the halogen heater 29 tends not to be shortened.

CONCLUSION

As described using FIG. 3, and the like, the driving circuit 35b functions as a first driving circuit for supplying power based on an alternating current supplied from the commercial alternating current power supply 30 to the halogen heater 29 in accordance with a set duty ratio if a pulse-shaped drive signal is being input. Also, the driving circuit 35b does not supply the power to the halogen heater 29 if the drive signal is not being input. The drive signal corresponds to the drive signal Honb described above, and has a high level and low level depending on the set duty ratio. The control section 38b is one example of a first control unit that supplies a drive signal to the driving circuit 35b if the temperature detected by the thermistor 28b is less than the first temperature. The control section 38b does not supply a drive signal to the driving circuit 35b if the temperature detected by the thermistor 28b is not less than the first temperature. The setting section 41b is one example of a first setting unit that sets the duty ratio d of the drive signal to the first duty ratio d1 if the alternating voltage Vin detected by the voltage detecting circuit 34 is less than the threshold. The setting section 41b sets the duty ratio d of the drive signal to the second duty ratio d2, which is less than the first duty ratio d1, if the alternating voltage Vin is not less than the threshold. The threshold value Vx is set to a value that is greater than the first nominal voltage and less than the second nominal voltage. In this way, a high duty ratio is set if the alternating voltage Vin is the first nominal voltage. A low duty ratio is set if the alternating voltage Vin is a second nominal voltage. In other words, even if the second nominal voltage is applied to the halogen heater 29 for which a regular power based on the first nominal voltage was set, a power not exceeding the regular power is supplied to the halogen heater 29. By this arrangement, a fixing device 12 that is capable of operating whichever a first nominal voltage and a second nominal voltage is supplied is provided. Also, the fixing device 12 can employ the halogen heater 29 of a single specification without sacrificing the lifespan of the halogen heater 29.

Note, the first nominal voltage and the second nominal voltage are each greater than or equal to 200V. In particular, the first nominal voltage may be 208V and the second nominal voltage may be 240V. In North America, there is a mix of buildings supplied with an alternating voltage of 208V and buildings supplied with an alternating voltage of 240V even in the same region. In such regions, the present embodiment may work effectively. The threshold value Vx may be set to an intermediate value between the first nominal voltage and the second nominal voltage. By this arrangement, it is possible to appropriately determine whether the power supply voltage is the first nominal voltage or is the second nominal voltage.

An induction heating (IH) heater functions as a second heater that heats the fixing belt 21, which is the second rotating member. In other words, the IH heater functions as a second heater comprising a coil that generates a magnetic field, and causes an induced current to be generated by causing the magnetic field to act on a conductive heating member provided in the second rotating member, to heat the heating member.

The rectification smoothing circuit 40 functions as a direct current power supply unit that generates a direct-current voltage by rectifying and smoothing an alternating current supplied from the commercial alternating current power supply 30. If a drive signal formed by a high frequency pulse is input, the driving circuit 35a functions as a second driving circuit that supplies a power to the second heater obtained by controlling the direct-current voltage generated by the rectification smoothing circuit 40 to be on/off in accordance with the drive signal. Note, the driving circuit 35a does not supply the power to the second heater if the drive signal is not being input. An example of the drive signal is the drive signal Hona. The control section 38a controls the frequency of the drive signal based on the alternating voltage Vin, the alternating current Iin, the temperature detected by the thermistor 28a, and the target temperature. The duty ratio of the drive signal is fixed. Specifically, while both an "on" width and an "off" width of a drive signal pulse are changed at a fixed duty ratio, a configuration may be employed in which an "on" width is changed with a fixed "off" width to control the frequency of the drive signal.

OTHER EMBODIMENTS

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A fixing apparatus operable in relation to either of a first nominal voltage and a second nominal voltage, as an alternating voltage of a commercial alternating current power supply, the apparatus comprising:
   a first rotating member;
   a second rotating member arranged to face the first rotating member and configured to convey a sheet while nipping the sheet with the first rotating member;
   a heater configured to be supplied with the alternating voltage from the commercial alternating current power supply and to heat the first rotating member;
   a voltage detector configured to detect the alternating voltage of the commercial alternating current power supply;
   a temperature detector configured to detect a temperature of one of the heater and the first rotating member;
   a driving circuit configured to supply power to the heater based on an alternating current supplied from the commercial alternating current power supply if a drive signal is being input, and not to supply the power to the heater if the drive signal is not being input; and
   a controller configured (a) to determine a duty ratio of the drive signal to be a first duty ratio if the alternating voltage of the commercial alternating current power supply detected by the voltage detector is less than a predetermined voltage, and to determine the duty ratio of the drive signal to be a second duty ratio, which is less than the first duty ratio, if the alternating voltage detected by the voltage detector is greater than the predetermined voltage, and (b) to supply the drive signal, set to the determined duty ratio, to the driving circuit if the temperature detected by the temperature detector is less than a first temperature, and not to supply the drive signal to the driving circuit if the temperature detected by the temperature detector is not less than the first temperature,
   wherein the predetermined voltage is a value that is greater than the first nominal voltage and that is less than the second nominal voltage.

2. The fixing apparatus according to claim 1, wherein the first heater is a halogen heater.

3. The fixing apparatus according to claim 1, wherein the first duty ratio is 100%.

4. The fixing apparatus according to claim 3, wherein the second duty ratio is a value determined in accordance with the first nominal voltage and the second nominal voltage.

5. The fixing apparatus according to claim 1, wherein the first rotating member is a roller, and the heater is provided within the roller.

6. The fixing apparatus according to claim 1, wherein the first nominal voltage and the second nominal voltage are each greater than or equal to 200V.

7. The fixing apparatus according to claim 6, wherein the first nominal voltage is 208V and the second nominal voltage is 240V.

8. The fixing apparatus according to claim 1, wherein the predetermined voltage is set to an intermediate value between the first nominal voltage and the second nominal voltage.

9. The fixing apparatus according to claim 1, further comprising another heater configured to heat the second rotating member.

10. The fixing apparatus according to claim 9, wherein the other heater comprises a coil that generates a magnetic field, and causes an induced current to be generated by causing the magnetic field to act on a conductive heating member provided in the second rotating member, to heat the conductive heating member.

11. An image forming apparatus comprising:
(A) an image carrier;
(B) a charging unit configured to uniformly charge the image carrier;
(C) a scanning unit configured to form an electrostatic latent image by scanning a laser beam on a surface of the image carrier;
(D) a developer unit configured to form a toner image by developing the electrostatic latent image and by causing toner to adhere to the image carrier;
(E) the transfer unit configured to transfer the toner image, formed on the image carrier, onto a sheet; and
(F) a fixing unit configured fix the toner image, transferred onto the sheet, to the sheet, wherein the fixing unit is a fixing device operable in relation to either of a first nominal voltage and a second nominal voltage, as an alternating voltage of a commercial alternating current power supply, the fixing device comprising:
(a) a first rotating member;
(b) a second rotating member arranged to face the first rotating member and configured to convey a sheet while nipping the sheet with the first rotating member;
(c) a heater configured to be supplied with the alternating voltage from the commercial alternating current power supply and to heat the first rotating member;
(d) a voltage detector configured to detect the alternating voltage of the commercial alternating current power supply;
(e) a temperature detector configured to detect a temperature of one of the heater and the first rotating member;
(f) a driving circuit configured to supply power to the heater based on an alternating current supplied from the commercial alternating current power supply if a drive signal is being input, and not to supply the power to the heater if the drive signal is not being input; and
(g) a controller configured to determine a duty ratio of the drive signal to be a first duty ratio if the alternating voltage of the commercial alternating current power supply detected by the voltage detector is less than a predetermined voltage, and to determine the duty ratio of the drive signal to be a second duty ratio, which is less than the first duty ratio, if the alternating voltage detected by the voltage detector is greater than the predetermined voltage, and (ii) to supply the drive signal, set to the determined duty ratio, to the driving circuit if the temperature detected by the temperature detector is less than a first temperature, and not to supply the drive signal to the driving circuit if the temperature detected by the temperature detector is not less than the first temperature,
wherein the predetermined voltage is a value that is greater than the first nominal voltage and that is less than the second nominal voltage.

12. A method of controlling a fixing device, which is operable in relation to either of a first nominal voltage and a second nominal voltage, as an alternating voltage of a commercial alternating current power supply, the fixing device comprising a first rotating member, a second rotating member arranged to face the first rotating member and configured to convey a sheet while nipping the sheet with the first rotating member, a heater configured to be supplied with the alternating voltage from the commercial alternating current power supply and to heat the first rotating member, and a driving circuit configured to supply power to the heater, the method comprising:
detecting the alternating voltage of the commercial alternating current power supply;
detecting a temperature of one of the heater and the first rotating member;
supplying, using the driving circuit, power to the heater based on an alternating current supplied from the commercial alternating current power supply if a drive signal is being input, and not supplying the power to the heater if the drive signal is not being input;
determining a duty ratio of the drive signal to be a first duty ratio if the alternating voltage of the commercial alternating current power supply is less than a predetermined voltage, and to determine the duty ratio of the drive signal to be a second duty ratio, which is less than the first duty ratio, if the alternating voltage of the commercial alternating current power supply is greater than the predetermined voltage; and
supplying the drive signal, set to the determined duty ratio, to the driving circuit if the detected temperature is less than a first temperature, and not supplying the drive signal to the driving circuit if the detected temperature is not less than the first temperature,
wherein the predetermined voltage is a value that is greater than the first nominal voltage and that is less than the second nominal voltage.

13. A fixing apparatus operable in relation to either of a first nominal voltage and a second nominal voltage, as an alternating voltage of a commercial alternating current power supply, the apparatus comprising:
a first rotating member;
a second rotating member arranged to face the first rotating member and configured to convey a sheet while nipping the sheet with the first rotating member;
a heater configured to be supplied with the alternating voltage from the commercial alternating current power supply and to heat the first rotating member;
a voltage detector configured to detect the alternating voltage of the commercial alternating current power supply;
a temperature detector configured to detect a temperature of one of the heater and the first rotating member;
a driving circuit configured to supply power to the heater based on an alternating current supplied from the commercial alternating current power supply if a drive signal is being input, and not to supply the power to the heater if the drive signal is not being input; and
a controller configured (a) to determine, as a first period, a supply period for supplying the alternating voltage to the heater in a half cycle of the alternating voltage of the commercial alternating current power supply if the alternating voltage of the commercial alternating current power supply detected by the voltage detector is less than a predetermined voltage, and to determine, as a second period, shorter than the first period, the supply period for supplying the alternating voltage to the heater in a half cycle of the alternating voltage of the commercial alternating current power supply if the alternating voltage detected by the voltage detector is greater than the predetermined voltage, and (b) to supply the drive signal to the driving circuit, such that the alternating voltage is supplied to the heater during the determined period, if the temperature detected by the temperature detector is less than a first temperature, and not to supply the drive signal to the driving circuit if the temperature detected by the temperature detector is not less than the first temperature, wherein the predetermined voltage is a value that is greater than the first nominal voltage and that is less than the second nominal voltage.

14. An image forming apparatus comprising:
(A) an image carrier;
(B) a charging unit configured to uniformly charge the image carrier;
(C) a scanning unit configured to form an electrostatic latent image by scanning a laser beam on a surface of the image carrier;
(D) a developer unit configured to form a toner image by developing the electrostatic latent image by causing toner to adhere to the image carrier;
(E) a transfer unit configured to transfer the toner image, formed on the image carrier, onto a sheet; and
(F) a fixing unit configured fix the toner image, transferred onto the sheet, to the sheet, wherein the fixing unit is a fixing device operable in relation to either of a first nominal voltage and a second nominal voltage, as an alternating voltage of a commercial alternating current power supply, the fixing device comprising:
(a) a first rotating member;
(b) a second rotating member arranged to face the first rotating member and configured to convey a sheet while nipping the sheet with the first rotating member;
(c) a heater configured to be supplied with the alternating voltage from the commercial alternating current power supply and to heat the first rotating member;
(d) a voltage detector configured to detect the alternating voltage of the commercial alternating current power supply;
(e) a temperature detector configured to detect a temperature of one of the heater and the first rotating member;
(f) a driving circuit configured to supply to the heater a power based on an alternating current supplied from the commercial alternating current power supply if a drive signal is being input, and not to supply the power to the heater if the drive signal is not being input;
(g) a controller configured (i) to determine, as a first period, a supply period for supplying the alternating voltage to the heater in a half cycle of the alternating voltage of the commercial alternating current power supply if the alternating voltage of the commercial alternating current power supply detected by the voltage detector is less than a predetermined voltage, and to determine, as a second period, shorter than the first period, the supply period for supplying the alternating voltage to the heater in a half cycle of the alternating voltage of the commercial alternating current power supply if the alternating voltage detected by the voltage detector is greater than the predetermined voltage, and (ii) to supply the drive signal to the driving circuit, such that the alternating voltage is supplied to the heater during the determined period, if the temperature detected by the temperature detector is less than a first temperature, and not to supply the drive signal to the driving circuit if the temperature detected by the temperature detector is not less than the first temperature, wherein the predetermined voltage is a value that is greater than the first nominal voltage and that is less than the second nominal voltage.

15. A method of controlling a fixing device, which is operable in relation to either of a first nominal voltage and a second nominal voltage, as an alternating voltage of a commercial alternating current power supply, the fixing device comprising a first rotating member, a second rotating member arranged to face the first rotating member and configured to convey a sheet while nipping the sheet with the first rotating member, a heater configured to be supplied with the alternating voltage from the commercial alternating current power supply and to heat the first rotating member, and a driving circuit configured to supply power to the heater, the method comprising:

detecting the alternating voltage of the commercial alternating current power supply;

detecting a temperature of one of the heater and the first rotating member;

supplying power to the heater based on an alternating current supplied from the commercial alternating current power supply if a drive signal is being input, and not supplying the power to the heater if the drive signal is not being input;

determining, as a first period, a supply period for supplying the alternating voltage to the heater in a half cycle of the alternating voltage of the commercial alternating current power supply if the alternating voltage of the commercial alternating current power supply is less than a predetermined voltage, and to determine, as a second period, shorter than the first period, the supply period for supplying the alternating voltage to the heater in a half cycle of the alternating voltage of the commercial alternating current power supply if the alternating voltage of the commercial alternating current power supply is greater than the predetermined voltage; and supplying the drive signal to the driving circuit, such that the alternating voltage is supplied to the heater during the determined period, if the detected temperature is less than a first temperature, and not supplying the drive signal to the driving circuit if the detected temperature is not less than the first temperature, wherein the predetermined voltage is a value that is greater than the first nominal voltage and that is less than the second nominal voltage.

* * * * *